(12) United States Patent
Werner et al.

(10) Patent No.: US 12,715,630 B2
(45) Date of Patent: Aug. 25, 2026

(54) FLIGHT MODULE

(71) Applicant: INNOTEC LIGHTWEIGHT ENGINEERING & POLYMER TECHNOLOGY GMBH, Goslar (DE)

(72) Inventors: Jens Werner, Wilsdruff STT Kesselsdorf (DE); Phil Pezus, Wilsdruff STT Kesselsdorf (DE); Matthias Bieler, Wilsdruff STT Kesselsdorf (DE); Florian Franke, Wilsdruff STT Kesselsdorf (DE)

(73) Assignee: INNOTEC LIGHTWEIGHT ENGINEERING & POLYMER TECHNOLOGY GMBH, Goslar (DE)

( * ) Notice: Subject to any disclaimer, the term of this patent is extended or adjusted under 35 U.S.C. 154(b) by 535 days.

(21) Appl. No.: 16/772,217

(22) PCT Filed: Dec. 13, 2018

(86) PCT No.: PCT/DE2018/101018
§ 371 (c)(1),
(2) Date: Jun. 12, 2020

(87) PCT Pub. No.: WO2019/114885
PCT Pub. Date: Jun. 20, 2019

(65) Prior Publication Data

US 2021/0206489 A1 Jul. 8, 2021

(30) Foreign Application Priority Data

Dec. 15, 2017 (DE) ......................... 102017130251.4
Dec. 15, 2017 (DE) ......................... 102017130252.2
(Continued)

(51) Int. Cl.
*B64U 80/25* (2023.01)
*B60L 53/00* (2019.01)
(Continued)

(52) U.S. Cl.
CPC .............. *B64U 80/25* (2023.01); *B60L 53/00* (2019.02); *B60L 53/16* (2019.02); *B60L 53/31* (2019.02);
(Continued)

(58) Field of Classification Search
CPC ...... B64C 1/08; B64C 2001/007; B64C 29/02
See application file for complete search history.

(56) References Cited

U.S. PATENT DOCUMENTS 3,002,712 A 10/1961 Beckwith
3,135,481 A 6/1964 Sudrow
(Continued)

FOREIGN PATENT DOCUMENTS

CN 205131632 U 4/2016
DE 102007023622 A1 * 1/2009 .............. B64C 1/12
(Continued)

OTHER PUBLICATIONS

NASA, Principles of Flight: Foam Wing K-12, Aug. 9, 2016, pp. 3-4 (Year: 2016).*

(Continued)

*Primary Examiner* — Justin Michael Heston
(74) *Attorney, Agent, or Firm* — Abel Schillinger, LLP

(57) ABSTRACT

A flight module for a vertical take-off and landing aircraft comprises multiple drive units arranged on a supporting framework structure that comprises struts interconnected at node points. Each drive unit comprises an electric motor and a propeller that is operatively connected to the electric motor. Some of the drive units are arranged outside the node points.

20 Claims, 12 Drawing Sheets

(30) Foreign Application Priority Data

Dec. 15, 2017 (DE) ......................... 102017130253.0
Dec. 15, 2017 (DE) ......................... 102017130254.9
Dec. 15, 2017 (DE) ......................... 102017130255.7

(51) Int. Cl.

| | |
|---|---|
| ***B60L 53/16*** | (2019.01) |
| ***B60L 53/31*** | (2019.01) |
| ***B60L 53/36*** | (2019.01) |
| ***B60L 53/50*** | (2019.01) |
| ***B64C 1/00*** | (2006.01) |
| ***B64C 7/00*** | (2006.01) |
| ***B64C 21/02*** | (2006.01) |
| ***B64C 29/00*** | (2006.01) |
| ***B64D 9/00*** | (2006.01) |
| ***B64F 1/00*** | (2006.01) |
| ***B64F 1/22*** | (2006.01) |
| ***B64F 1/30*** | (2006.01) |
| ***B64F 1/36*** | (2017.01) |
| ***B64U 10/16*** | (2023.01) |
| ***B64U 20/40*** | (2023.01) |
| ***B64U 30/12*** | (2023.01) |
| ***B64U 50/31*** | (2023.01) |
| ***H02J 7/50*** | (2026.01) |
| *B64U 30/20* | (2023.01) |
| *B64U 50/19* | (2023.01) |
| *B64U 101/61* | (2023.01) |

(52) U.S. Cl.

CPC ............... *B60L 53/36* (2019.02); *B60L 53/50* (2019.02); *B64C 7/00* (2013.01); *B64C 21/02* (2013.01); *B64C 29/0016* (2013.01); *B64D 9/00* (2013.01); *B64F 1/00* (2013.01); *B64F 1/22* (2013.01); *B64F 1/30* (2013.01); *B64F 1/362* (2013.01); *B64U 10/16* (2023.01); *B64U 20/40* (2023.01); *B64U 30/12* (2023.01); *B64U 50/31* (2023.01); *H02J 7/50* (2026.01); *B60L 2200/10* (2013.01); *B64C 2001/0072* (2013.01); *B64U 30/20* (2023.01); *B64U 50/19* (2023.01); *B64U 2101/61* (2023.01)

(56) References Cited

U.S. PATENT DOCUMENTS

| | | | | |
|---|---|---|---|---|
| 3,589,646 | A | 6/1971 | Mori | |
| 5,996,933 | A | 12/1999 | Schier | |
| 6,399,199 | B1 * | 6/2002 | Fujino | C08L 63/00 428/375 |
| 6,598,827 | B2 | 7/2003 | Kusic | |
| 9,174,733 | B1 * | 11/2015 | Burgess | B64C 39/024 |
| 9,321,531 | B1 * | 4/2016 | Takayama | B64C 39/02 |
| 9,536,216 | B1 * | 1/2017 | Lisso | B65B 43/00 |
| 9,580,173 | B1 * | 2/2017 | Burgess | B64D 1/22 |
| 9,630,713 | B1 | 4/2017 | Von Novak, III | |
| 9,650,136 | B1 * | 5/2017 | Haskin | B64D 1/12 |
| 9,928,749 | B2 * | 3/2018 | Gil | B64F 1/0299 |
| 9,969,494 | B1 * | 5/2018 | Buchmueller | G05D 1/0858 |
| 10,308,358 | B2 | 6/2019 | Phan | |
| 10,913,547 | B1 | 2/2021 | Thrun et al. | |
| 2006/0266881 | A1 | 11/2006 | Hughey | |
| 2011/0017865 | A1 | 1/2011 | Achtelik | |
| 2012/0298790 | A1 | 11/2012 | Bitar | |
| 2014/0374532 | A1 | 12/2014 | Duffy et al. | |
| 2015/0012154 | A1 | 1/2015 | Senkel et al. | |
| 2016/0023759 | A1 | 1/2016 | Barrett et al. | |
| 2016/0214728 | A1 * | 7/2016 | Rossi | B64C 39/024 |
| 2017/0116814 | A1 | 4/2017 | Storch et al. | |
| 2018/0002009 | A1 * | 1/2018 | McCullough | B64C 39/02 |
| 2018/0002013 | A1 * | 1/2018 | McCullough | B64C 39/024 |
| 2018/0002015 | A1 * | 1/2018 | McCullough | B64D 1/08 |
| 2018/0002026 | A1 * | 1/2018 | Oldroyd | B64C 29/02 |
| 2018/0141647 | A1 | 5/2018 | Suzuki | |
| 2018/0312267 | A1 | 11/2018 | Tian | |
| 2019/0127052 | A1 | 5/2019 | Chen et al. | |
| 2020/0094959 | A1 | 3/2020 | Suzuki | |

FOREIGN PATENT DOCUMENTS

| | | | | |
|---|---|---|---|---|
| DE | 202012001750 | U1 | 3/2012 | |
| DE | 102013108207 | A1 | 2/2015 | |
| EP | 3243747 | A1 | 11/2017 | |
| EP | 3243750 | A1 * | 11/2017 | B64C 11/28 |
| EP | 3482618 | A1 | 5/2019 | |
| FR | 1347415 | A | 12/1963 | |
| JP | 2002370696 | A | 12/2002 | |
| JP | 2011046355 | A | 3/2011 | |
| JP | 2014240242 | A * | 12/2014 | |
| JP | 2014240242 | A1 | 12/2014 | |
| WO | 2013124300 | A1 | 8/2013 | |
| WO | 2016185572 | A1 | 11/2016 | |
| WO | 2017000528 | A1 | 1/2017 | |

OTHER PUBLICATIONS

NASA, Principles of Flight: Foam Wing K-12, Aug. 9, 2016, found on [nasa.gov/aeroresearch/resources/mib/foam-wing (Year: 2016).*

NASA Principles of Flight: Foam Win K-12, Aug. 9, 2016, pp. 3-4, found on [nasa.gov/aeroresearch/resources/mib/foam-wing] (Year: 2016).*

Composites World, "Fiber Reinforcement Forms", Jan. 1, 2014, found on [web.archive.org/web/20160902233353/https:www.compositesworld.com/articles/fiber-reinforcement-forms] (Year: 2014).*

Fibre Glast, "What are Unidirectional Carbon Fiber Fabrics?", accessed on Jan. 27, 2017, found on [web.archive.org/web/20170127150325/https://www.fibreglast.com/product/what-are-unidirctional-carbon-fiber-fabrics] (Year: 2017).*

U.S. Appl. No. 16/772,213, filed Jun. 12, 2020.

U.S. Appl. No. 16/772,225, filed Jun. 12, 2020.

U.S. Appl. No. 16/772,228, filed Jun. 12, 2020.

U.S. Appl. No. 16/772,233, filed Jun. 12, 2020.

* cited by examiner

5

5

5

FLIGHT MODULE

BACKGROUND OF THE INVENTION

Field of the Invention

The invention relates to a flight module for a vertical take-off and landing aircraft.

Discussion of Background Information

Aircraft for transporting persons and/or loads are becoming increasingly important because they enable rapid transportation largely independently of infrastructure facilities such as roads, railways, bridges, tunnels, etc. This is particularly true for smaller aircraft that can take off and land vertically and therefore do not require a runway.

From WO 2013/124300, for example, an aircraft is known that has a plurality of propellers arranged in one surface with electric motors assigned to them. The rotor blades of the propellers and their blade roots can consist of a fiber-reinforced composite, for example carbon-fiber-reinforced plastic. In an embodiment described in more detail, the aircraft comprises a frame structure formed from tension and compression-resistant struts, which are linked at node points to form a hexagonal structure with triangular unit cells. The propellers are arranged at the nodes.

DE 10 2013 108 207 A1 also discloses an aircraft that can be modularly mounted and dismounted and is suitable for the salvage of persons or objects. The aircraft has a central module on which boom arms with rotor units and a support unit for receiving payload or one or more persons can be arranged. In addition, the aircraft has rotors arranged in a plane, which each have an electric drive together with electrical power supply unit and control electronics.

The problem underlying the invention is to specify a versatile vertical take-off and landing aircraft that exhibits improved stability and consequently better operational safety.

This problem is solved by the subject matter of the independent claim. Advantageous developments of the invention are specified in the dependent claims.

SUMMARY OF THE INVENTION

The vertical take-off and landing aircraft according to the invention has a flight module for propulsion of the aircraft, which can be modularly joined to a transport module for transporting persons and/or payloads.

The flight module comprises a plurality of drive units arranged on a supporting framework structure, the supporting framework structure comprising framework struts joined together at node points, and each drive unit having an electric motor and at least one propeller operatively connected to the electric motor.

According to the invention, it is provided that a number of the drive units, i.e. some or all of the drive units, are arranged outside of the node points, for example centrally on one of the framework struts.

The number of drive units arranged outside of the node points is determined by some of the drive units or all of the drive units of the flight module.

The drive units can optionally be arranged in one or more planes, such as in one plane of the supporting framework structure, for example, and/or above and/or below the supporting framework structure.

In addition, multiple drive units can be arranged one above the other coaxially to the rotor shaft of the electric motors.

The flight module is used to power a vertical take-off and landing (VTOL) aircraft, in particular an aircraft designed to transport persons and/or loads. The supporting framework structure can comprise radially, axially and tangentially arranged, preferably straight or curved framework struts, which for example may be connected together at node points using the connecting pieces assigned to the supporting framework structure, e.g. T-pieces, and if necessary to a central unit arranged centrally in the supporting framework structure.

The interconnected framework struts preferably form a self-contained supporting framework structure, i.e. without any free-ended framework struts, which is therefore particularly rigid.

For example, the framework struts can be arranged in such a way that a flat, hexagonally braced supporting framework structure is formed. For this purpose, six radially evenly spaced framework struts can be arranged so that two adjacent radially arranged framework struts form an angle of approximately 60°.

The connecting pieces can preferably be designed to enable a flat, flush fit of the framework struts in the connecting piece. It is particularly preferable that an arm of the connecting piece completely encloses the framework strut in the manner of a plug-in connection. Such a fitting enables a specific alignment, and a more even distribution of the bearing forces.

To form a supporting framework structure with a flat, hexagonal shape, three arms of the connecting piece can be arranged in one plane, with an angle between the arms of approx. 60°. The connecting pieces can consist of an upper and lower shell, to facilitate assembly and maintenance.

To increase the strength of the joint, the framework struts can be joined together in a form-fitting manner inside the connecting pieces. The ends of the framework struts can be designed so that they can be slotted together.

The propellers can have two or more rotor blades, which are attached to a hub by their blade roots. The rotor blades are shaped and orientated in such a way that the surrounding air flows around them asymmetrically when the propeller rotates, thus generating a lift force in the flight module. The lift force of the flight module can be variable, whereby the propellers can have a fixed or directionally adjustable shaft to adjust the tilt angle of the propellers, and the rotor blades can also have a fixed or adjustable shaft for adjusting their angle of incidence.

One or more propellers can be assigned to each electric motor, where the electric motor is operatively connected to the propeller(s), i.e. it drives the propeller(s). For this purpose, the propeller(s) and associated electric motor can be bolted together.

Multiple propellers arranged coaxially to the rotor shaft can be assigned to one electric motor, and can be arranged above and/or below the electric motor.

The electric motors can be designed as brushless DC motors. Such motors are characterized by low maintenance requirements. In addition, each drive unit can have a motor controller so that each drive unit can be controlled independently of the other drive units.

For sealing, e.g. against water or dirt, and/or to reduce aerodynamic drag, a cover can be fitted to each drive unit, e.g. in the form of a so-called spinner for streamlined covering of the hub.

For example, the flight module in the hexagonal embodiment of the supporting framework structure can have a total of 18 drive units.

The flight module or the individual propellers can be designed without shrouding or with a shroud. The shroud can be designed as a protective grille, for example. A shroud increases safety for ground crew and passengers by preventing accidental contact with the rotor blades. The design without shrouding has the advantage of a lower weight of the flight module and simplifies propeller maintenance.

The arrangement according to the invention of a number of drive units outside of the node points improves the stability of the flight module, since the propulsion forces are transmitted into the supporting framework structure outside of the node points. In this way, the node points, which already experience high loads from the framework struts, are not additionally stressed by the propulsion forces.

As a result, the supporting framework structure can be built with less material, i.e. it is lighter in terms of mass and cheaper to produce.

The arrangement of the required drive units outside the node points also minimises the necessary framework struts and node points, which simplifies the supporting framework structure and thus makes it more cost-effective.

In addition, the minimised design of the supporting framework structure ensures a lower mass while also producing less coverage of the propellers' downwash area, which in each case improves the efficiency of the flight module and thus reduces fuel consumption during use of the flight module.

Furthermore, the design according to the invention results in higher functional reliability and thus improved operational safety of the flight module.

According to various embodiments, the flight module can have a central unit, which can preferably be arranged centrally to a centre axis (M) of the flight module. The centre axis (M), for example, can be an axis of symmetry of the flight module and/or run perpendicular to a supporting framework structure arranged essentially in one plane.

In regard to its outer shape, the central unit can be designed as a hemisphere, sphere, flattened sphere or ellipsoid and, for example, can have a housing e.g. in the form of a hemisphere or an ellipsoid. For example, the central unit can be formed of two halves that are joined, e.g. bolted together. Openings may be provided for maintenance and for carrying out small repairs. The central unit may also be designed to support struts of the supporting framework structure, e.g. where one end of the framework struts is attached to the central unit and they extend radially outwards from the central unit.

The central unit may be designed for example for the storage or arrangement of objects, such as auxiliary equipment or technical functional units. For example, the central unit may have a rescue system, e.g. a parachute to shoot out, in the uppermost part of the central unit.

The central unit may have technical functional units, such as control, positioning and/or communication technology and/or a charging module.

The housing of the central unit may have one or more cavities for storing or arranging the auxiliary equipment and/or technical functional units. The auxiliary equipment or technical functional units may be arranged in the cavities and/or on the housing, for example on the top or side in the free space between the radial framework struts.

An integrated charging module can have energy storage devices, e.g. in the form of rechargeable batteries or supercapacitors, a charging device and/or solar cells.

The charging device may be designed to transfer electrical energy from an external charging station to the energy storage device(s).

The energy storage devices may be designed to store the electrical energy that is transferred and/or self-generated by means of solar cells, and to supply energy to the drive units and/or the aircraft's transport module which can be coupled to the flight module.

By means of the integrated control, positioning and/or communication technology, the flight module may be capable of partially autonomous or fully autonomous operation, depending on the specific design.

The integrated positioning technology can for example use positioning signals e.g. from a global satellite navigation system such as GPS, Galileo, GLONASS, Beidou etc. to determine the location of the flight module or aircraft and to determine and control the flight route and destination of the flight module or aircraft.

The integrated communication technology can be designed for internal and/or external communication, where internal communication means communication with modules that are intended directly for use with the flight module, for example communication between the flight module and transport module or flight module and ground control station.

External communication means for example communication regarding flight permission, flight route, location etc. for air traffic control or exchanging information with meteorological services.

In addition, the central unit may also have software and/or hardware for carrying out a landing approach to a take-off and landing station.

The positioning of auxiliary equipment and technical functional elements in or on the centrally arranged central unit can enable a centre of gravity position focused in the centre of the flight module, thus improving the controllability of the flight module.

According to various embodiments, the flight module, preferably its central unit, can have a coupling device for connecting the flight module to a transport module. In other words, the coupling device is designed for coupling and uncoupling a transport module. Preferably the coupling device can be located centrally on the central unit. The coupled-together modules (transport module and flight module) together form the aircraft.

In one design variant, the coupling device can be designed as a coupling counterpart of an articulated coupling between a couplable transport module and the flight module.

The coupling piece of the articulated coupling which corresponds to the coupling counterpart is arranged on a transport module in such a way that the transport module can be coupled with the flight module in a directionally flexible manner.

As a result, the inclination of the flight module, i.e. the tilt angle $\alpha$, which is described by a line of gravity perpendicular to the earth's surface and the plane E of the supporting framework structure, can be varied. When the transport module is coupled, the angle of inclination between the flight module and transport module can therefore be varied. This ensures, for example, a comfortable, essentially always vertical orientation of the transport module, even if the control input for the tilt of the flight module is different. If the transport module is arranged on the flight module in vertical orientation, the line of gravity corresponds to a longitudinal axis of the shaft of the transport module.

Furthermore, in this arrangement the centre of gravity of the aircraft can be centred in a central area of the flight module, so that the controllability of the aircraft can be improved.

For example, the tilt angle $\alpha$ can be variable between 30° and 150°. With a tilt angle $\alpha$ of 90°, the plane of the flight module's supporting framework structure is perpendicular to the line of gravity and therefore parallel to the earth's surface. In this state, the line of gravity can correspond to the centre axis of the flight module. When the flight module accelerates, the plane E of the supporting framework structure can be tilted downwards in the direction of flight, i.e. a tilt angle $\alpha<90°$ is set. When the flight module decelerates, the plane E of the supporting framework structure can be tilted upwards in the direction of flight, i.e. a tilt angle $\alpha>90°$ is set.

The coupling device can preferably be designed so that the correct coupling of the transport module is always ensured under any operational load. Furthermore, it can have a control mechanism to confirm a proper connection and a safeguard mechanism to manually release the connection in the unloaded state. The coupling device can have a damping device, which can be designed to absorb hard landing impacts, for example.

According to various embodiments, the flight module can have one or more air guiding devices, preferably the air guiding devices can be attached to the flight module's framework struts or to the connecting pieces for joining the framework struts of the supporting framework structure.

The air guiding devices can serve as lift and steering and flight aids to increase the efficiency of the flight module as well as to stabilise and/or improve the flow characteristics and hence the controllability of the flight module.

The air guiding devices can be designed like wings, for example flat or slightly curved. Optionally, the air guiding devices can be designed so that their position can be rotated or moved linearly in relation to the rest of the flight module.

For example, the wing-like air guiding devices can be folded up against and unfolded from the supporting framework structure and/or be mounted so as to be rotatable about their longitudinal axis.

The air guiding devices can be designed to be at least partially controllably adjustable in their orientation to a transport module coupled to the flight module and/or to the flight module's supporting framework structure, in particular with an angle of incidence ß relative to the transport module, and/or be variably orientatable relative to the supporting framework structure, so that their lift and/or steering function can be optimally adjusted to the flow conditions etc. during flight.

In particular, the air guiding devices attached to the supporting framework structure and mounted so as to be rotatable about their longitudinal axis can each be variable in an angle of incidence ß enclosed between the plane E of the supporting framework structure and a middle cross-section plane of the air guiding device. The angle of incidence ß can preferably be variable in a range between 110° (wing section of the air guiding device facing in the direction of flight is set pointing steeply upwards in the direction of flight) and 260° (wing section of the air guiding device facing against the direction of flight is set steeply upwards). With an angle of incidence ß of 180°, the air guiding devices and the supporting framework structure are in one plane. If there are multiple air guiding devices, the respective angles of incidence ß can be variable independently of each other.

By varying the angle of incidence ß, for example the lift function of the flight module can be influenced according to the flow conditions. If the air guiding devices are each orientated with different angles of incidence ß, the steering function of the flight module can be influenced, for example.

In one embodiment, the angle of incidence ß can be variable depending on the tilt angle $\alpha$. If the flight module is tilted relative to the line of gravity S, reduced lift due to the tilt of the flight module can be increased again by suitable variation of the angle of incidence ß. When the flight module is accelerating with the plane E of the supporting framework structure tilted downwards in the direction of flight ($\alpha<90°$), the air guiding devices can be adjusted in the opposite direction to this, i.e. with an angle of incidence ß greater than 90° and less than 180°. When the flight module is decelerating with the plane E of the supporting framework structure tilted upwards in the direction of flight ($\alpha>90°$), the air guiding devices can be adjusted in the opposite direction to this, i.e. with an angle of incidence ß greater than 180° and less than 270°.

Such lift aids not only improve the lift of the flight module, thus reducing propeller power and saving energy, but also e.g. improve the flight stability of the aircraft.

To implement the above-described operating modes of the aircraft and the air guiding devices, the control technology of the flight module can for example be set up and designed to output a control signal to switch the drive units on or off. Alternatively or additionally, the control technology can be set up and designed to output a control signal for opening or closing the coupling device and/or for adjusting the tilt angle $\alpha$, i.e. the inclination of a coupled transport module relative to the flight module. The coupling device can accordingly be designed as a controllable coupling device. Alternatively or additionally, the control unit can be designed to output a control signal for adjusting the angle of incidence ß.

According to various embodiments, it can be provided that a number of drive units, i.e. some or all of the drive units, are arranged concentrically around a centre axis (M) of the flight module. In other words, the drive units can be arranged symmetrically around a common centre with the centre axis (M) of the flight module and distributed in one or more planes. By this means and furthermore also by means of the central unit arranged centrally in the flight module, a stable flight characteristic of the flight module can be achieved.

For example, a number of the drive units can be arranged at an identical radial distance (radius) from the centre axis (M) of the flight module and thus in a ring around the centre axis (M) of the flight module.

Preferably the radial distance is to be understood as the distance between the centre axis (M) of the flight module and the hub axis of the respective propeller of the drive unit.

The number of drive units with identical radial distance from the centre axis (M) of the flight module form a ring in an imaginary circular-arc-shaped connecting line with a constant radius.

The drive units can also be arranged in several rings with identical radius or ring diameter on several planes around the centre axis (M).

The drive units can be arranged in several rings (R1, R2, R3) with different radius or ring diameter (DR1, DR2, DR3) in one plane around the centre axis (M) of the flight module.

By arranging a number of drive units particularly in one or more rings, a first group of drive units can for example have a first, identical radial distance from the centre axis (M) of the flight module and form a first ring (R1). A second group of drive units can have a second, identical radial distance from the centre axis (M) and form a second ring (R2) and so on.

A third ring (R3) with the drive units at the greatest distance from the centre axis of the flight module can form the outer ring, while the first ring (R1) forms an inner ring with the smallest distance from the centre axis (M) of the flight module.

The ring diameters of the rings and the diameters of the propeller rotors can be selected depending on the dimensions of the transportation capsule to adjust the downdraft generated by the propellers of the drive units with respect to the position and size of the transportation capsule.

The diameter of a propeller rotor is to be understood as the diameter of the circular line generated by the outer ends of the rotor blades during the rotational movement of the propeller rotor blades.

Thus preferably the ring diameter of the first, inner ring (R1) can be arranged so that the vertically projected circular lines of the rotors of the drive units of the first, inner ring do not overlap the vertically projected area of the transportation capsule.

This can make a sustained improvement to the aircraft's aerodynamics.

Of course, the design of the supporting framework structure, in particular the arrangement of the framework struts, also determines the specific position of the drive units on the supporting framework structure.

If, for example, the framework struts in the supporting framework structure are arranged hexagonally, a first inner ring for example can have six drive units each centred on one of the six radially outwardly pointing struts, while a second ring can have another six drive units each at the outer end of the radially outwardly pointing struts.

A further six drive units can each be arranged centrally on one of the framework struts which connect the radially outwardly pointing framework struts and radially close the supporting framework structure, and form a third ring.

The direct, straight connecting lines of the hub axes of the propellers of a ring can therefore essentially form a hexagon.

According to various embodiments, the rotors of the propellers of a number of drive units can have different diameters.

The diameter of a propeller rotor is to be understood as the diameter of the circular line generated by the outer ends of the rotor blades during the rotational movement of the propeller rotor blades.

It is possible that all rotors have a different diameter or that a first group of rotors has a uniform diameter, but a second group of rotors has a diameter different than that of the first group of rotors.

For example, rotors of the propellers of the drive units of a ring can have a uniform diameter. Alternatively, the rotors of the propellers of the drive units of a ring can have different diameters.

For example, rotors of the propellers of the drive units of a ring can have alternately different diameters.

By arranging drive units with different rotor diameters, the area utilisation of the air space above the supporting framework structure can be optimised and thus the lift force of the flight module can be improved.

If three rings of drive units are provided, for example, then for example the rotors of the propellers of the drive units of the first ring R1 can have a first uniform diameter d1, while the rotors of the propellers of the drive units of the second ring R2 can have a second uniform diameter d2 and the rotors of the propellers of the drive units of the third ring R3 can have a third uniform diameter d3.

Furthermore, it is possible that the rotors of the propellers of the drive units of a first and a second ring R1, R2 have a uniform diameter and the rotors of the propellers of the drive units of the third ring R3 have a different diameter, so that in total there are only two groups of propellers of different diameters.

This reduces manufacturing costs, since only two propeller groups with two different rotor diameters have to be manufactured.

According to further embodiments, the diameters of the rotors can be selected so that the airspaces used by the rotors at least partially overlap in a plan view perpendicular to the flight module. In such an embodiment, the drive units are preferably arranged in several planes so that any collision of the rotors can be avoided in this way also.

In their own way, all variants enable improved airspace utilisation, since there are fewer gaps in the airspace above the supporting framework structure that cannot be filled by a rotor circle of the propellers, as well as a more favourable load distribution within the flight module.

However, to simply manufacturing, assembly and maintenance, all propeller rotors can also have a uniform diameter.

According to further embodiments, a number of framework struts, i.e. some or all of them, can have a hollow profile.

Framework struts with hollow profile achieve a favourable mass reduction, which has the benefit of improving the efficiency of the flight module.

If the hollow profile has at least partially curved wall surfaces, this has a favourable effect on the aerodynamics of the flight module, which helps to reduce drag and further improves the efficiency of the flight module. In addition, the curved wall surfaces have a favourable effect on the buckling properties of the framework strut.

Designing the framework struts as hollow profiles allows a signal connection to the drive units and/or a power supply line for the drive units to be arranged inside the framework struts so that these are largely protected from environmental influences.

The hollow profile of the framework strut, according to further embodiments, can have a profile cross-section that is extended longitudinally in the effective direction of the drive units, preferably an oval profile cross-section.

Due to the uniform effective direction of the drive units, there is a main direction of the bending load on the framework struts, which can be advantageously compensated by the longitudinally extended design of the profile cross-section with its longitudinal sides orientated vertically.

The longitudinally extended profile cross-section can, for example, be formed by an oblong, elliptical, oval or combined oval profile cross-section, where the longitudinal sides of each of the longitudinally extended profile cross-sections are always extended vertically in the direction of the effective direction of the drive units.

The profile cross-section of the hollow profile with its long sides orientated vertically in the direction of the effective direction of the drive units can support a higher bending load than, for example, a circular cross-section of the hollow profile, owing to the effective direction of the drive units.

The oblong profile cross-section means a cross-section whose boundary line is formed by two circular arcs of the same or different radii and two straight sections.

The boundary line of an elliptical cross-section is composed of an infinite number of different radii.

Preferably, the hollow profile has an oval profile cross-section.

An oval cross-section means a cross-section whose boundary line is formed by two different radii.

A combined oval profile cross-section can have more than two radii, e.g. three or four radii.

A hollow profile with an elliptical, oval or combined oval cross-section profile, which has only curved surfaces, is also less susceptible to buckling than an oblong profile cross-section with flat surfaces.

In addition, the oval or combined oval cross-section of the hollow profile can offer an even more favourable ratio of cross-sectional area to area moment of inertia due to the larger radius on its narrow sides compared to the tapered elliptical cross-section.

The cross-section of the hollow profile can be adapted to the force path and the expected mechanical loads, preferably in thickness and shape. For example, the hollow profile of the framework strut can have a variable, i.e. changing wall thickness along the longitudinal extension of the framework strut and/or in the circumferential direction of the framework strut.

According to further embodiments, the supporting framework structure and/or the central unit and/or a number of the drive units can have components made of fiber-reinforced composite or consist of fiber-reinforced composite.

Thus, for example, a number of the framework struts and/or connecting pieces and/or fastening means of the supporting framework structure for attaching the drive units and/or hubs of the propellers and/or the housing of the central unit can include a fiber-reinforced composite or consist of a fiber-reinforced composite.

The fiber-reinforced composite can for example be a fiber-reinforced plastic such as carbon-fiber, glass-fiber or basalt-fiber-reinforced plastic.

The fiber-reinforced composite can have special textile fiber reinforcement elements. The textile fiber reinforcement can be incorporated into a plastic matrix in the form of flat or ribbon-like woven, knitted, stitch-bonded or braided fabric.

For example, the housing of the central unit can be made of a fiber-reinforced plastic. If the central unit has communication hardware, glass-fiber-reinforced plastic can preferably be used to avoid impairing the functionality of the communication hardware.

The use of fiber-reinforced composites improves the flight module's stability to mass ratio, since the components made of fiber-reinforced composites have a low mass and at the same time good to very good mechanical properties, such as strength, Young's modulus and impact strength.

In one embodiment, the framework struts can be formed of a pultruded hollow profile made from fiber-reinforced plastic, e.g. carbon-fiber-reinforced plastic.

Preferably, the fiber-reinforced composite can have unidirectionally arranged reinforcing fibers.

The reinforcing fibers can be concentrated and essentially uniformly aligned as so-called UD fiber straps, which are used in differentially arranged layers within the fiber composite material to compensate for certain high mechanical loads that occur on the framework struts.

For example, tensile, compressive and/or bending loads within the framework struts can be absorbed by UD fiber straps made of unidirectional, axially running reinforcing fibers, while torsional and/or shearing stresses can be compensated by fibers aligned at an angle of +/−45°, e.g. in a fabric or scrim.

It advantageous to use a textile fiber reinforcement in the preform of the framework struts to compensate for the stress that occurs, for example as follows:

alternating arrangement of individual fiber layers with fibers aligned at an angle of +/−45° by wrapping, unidirectional, axially running threads as straps on the top and bottom of the framework struts, finally outer fiber layer with fibers aligned at an angle of +/−45° by braiding.

The fiber structure with crossed and undulated fibers that is created by braiding increases the robustness of the supporting framework structure strut.

In addition, the outer layer with a fiber structure of fibers aligned at an angle of +/−45° compensates in particular for the torsional stress on the framework strut.

According to various embodiments, a number of drive units, e.g. some or all of the drive units, can be connected to the supporting framework structure, preferably to the framework struts, by means of force-fitting and/or form-fitting fastening means.

Preferably the fastening means is designed as a bracket which at least partially encloses a supporting framework structure strut.

For example, the bracket can be designed in such a way that it encloses the hollow profile of the framework strut in a flush manner, i.e. the shape of the bracket follows the outer contour of the framework strut.

To increase stability and stiffness, the bracket can have an omega-shaped cross-section so that the torque of the drive units as well as bending and vibration loads can be compensated.

The bracket can be bolted, glued or riveted to the supporting framework structure strut or joined to it by means of tightening a clamp connection.

The brackets can have an area that is angled to one side to accommodate the drive units. In this area, the bracket can be joined to the drive unit by means of a bolted or riveted connection.

The force-fitting and/or form-fitting connection can enable better positioning of the drive units on the supporting framework structure and better power transmission from the drive units to the supporting framework structure.

The fastening means, e.g. the bracket, can be made in several parts, preferably in two parts, to simplify assembly and removal.

BRIEF DESCRIPTION OF THE DRAWINGS

Further advantages of the present invention are evident from the illustrations and the associated description. They show.

DETAILED DESCRIPTION OF EMBODIMENTS OF THE INVENTION

In the examples explained below, reference is made to the accompanying drawings, which form part of the examples and in which specific embodiments in which the invention can be put into practice are shown for illustrative purposes. In this respect, directional terminology such as "top", "bottom", "front", "back", "forward", "rear" etc. is used with reference to the orientation of the described figures. Since components of embodiments can be positioned in a number of different orientations, the directional terminology is used for illustrative purposes and is in no way restrictive.

It is to be understood that other embodiments can be used and structural or logical changes made without departing from the protective scope of the present invention. It is to be understood that the features of the various example embodiments described herein can be combined with each other, unless specifically stated otherwise. The following detailed description is therefore not to be understood in a restrictive sense, and the protective scope of the present invention is defined by the appended claims.

For the purposes of this description, the terms "connected", "joined", "attached" and "coupled" are used to describe both a direct and an indirect connection, a direct or indirect joint, a direct or indirect attachment, and a direct or indirect coupling. In the figures, identical or similar elements are provided with identical reference marks, where appropriate.

Figure 1:
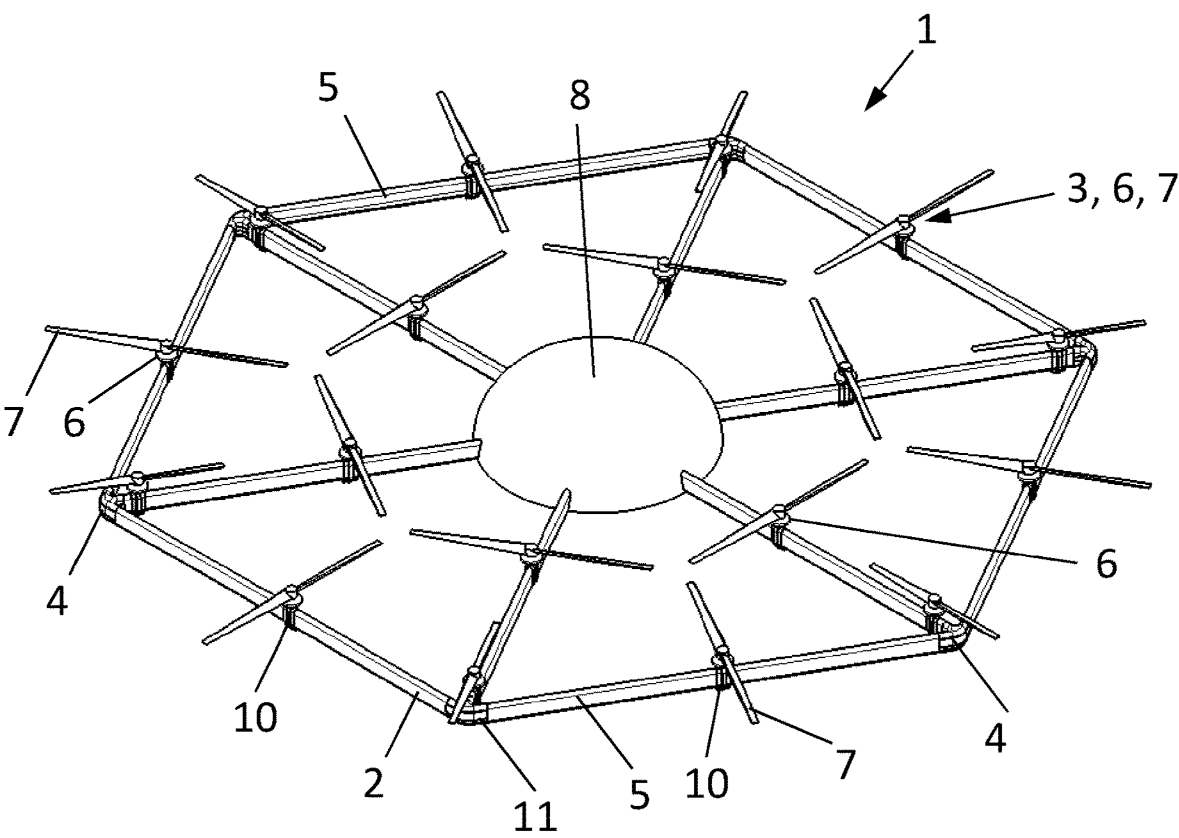
FIG. 1 Exemplary depiction of a flight module with central unit.
Figure 2:
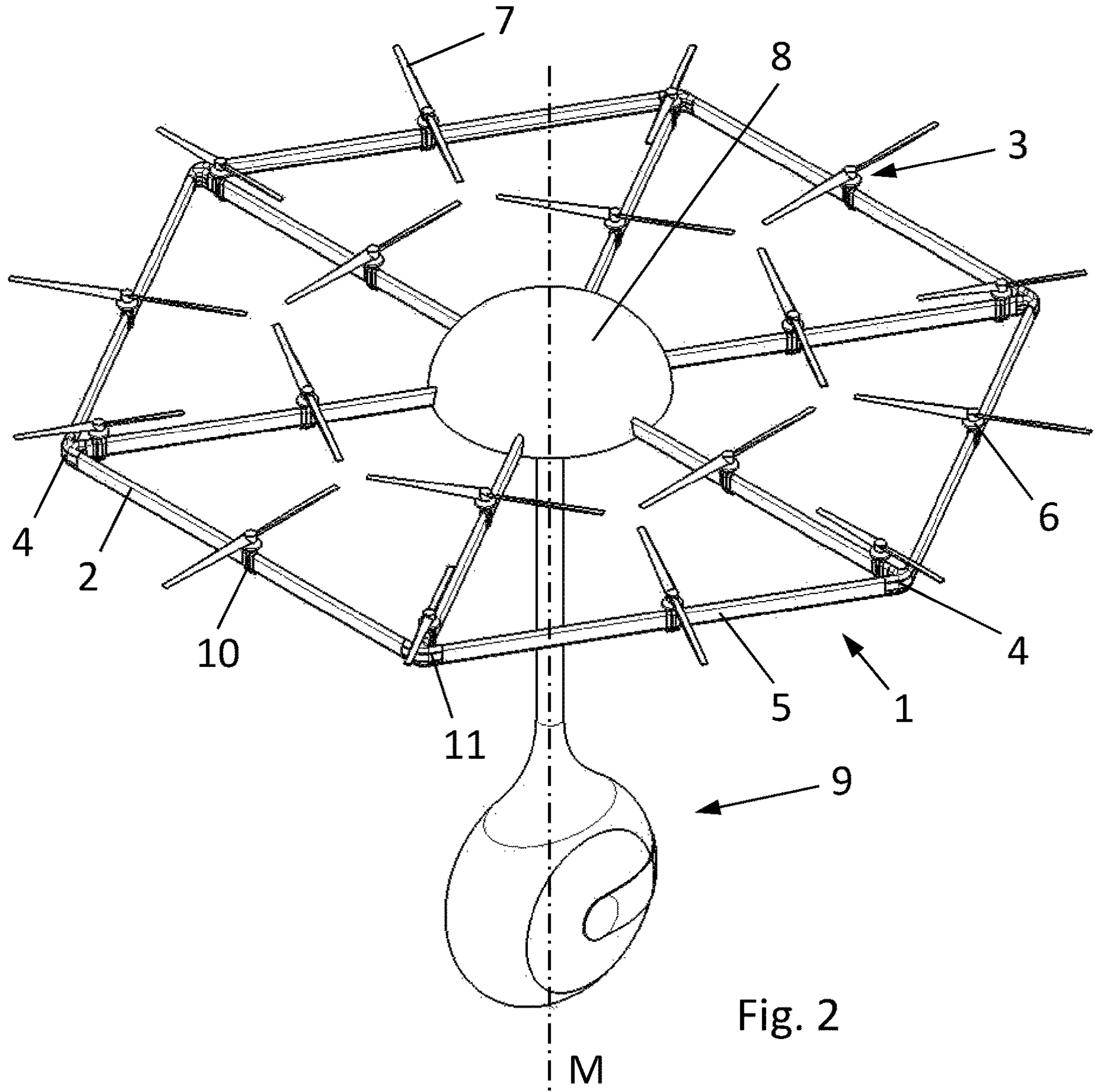
FIG. 2 Exemplary depiction of a flight module with central unit and coupled transport module.

FIG. 1 shows an example depiction of a flight module 1 for a vertical take-off and landing aircraft according to FIG. 2. In addition to a central unit 8 arranged centrally to the vertical axis of the flight module 1, the flight module 1 has a supporting framework structure 2 with multiple framework struts 5, which are joined to each other at node points 4 by means of connecting pieces 11 designed as T-pieces as well as to the central unit 8.

As shown in FIG. 2, the aircraft comprises the flight module 1 and a transport module 9 connected to the flight module 1 for the transportation of persons and/or payloads.

Figure 4:
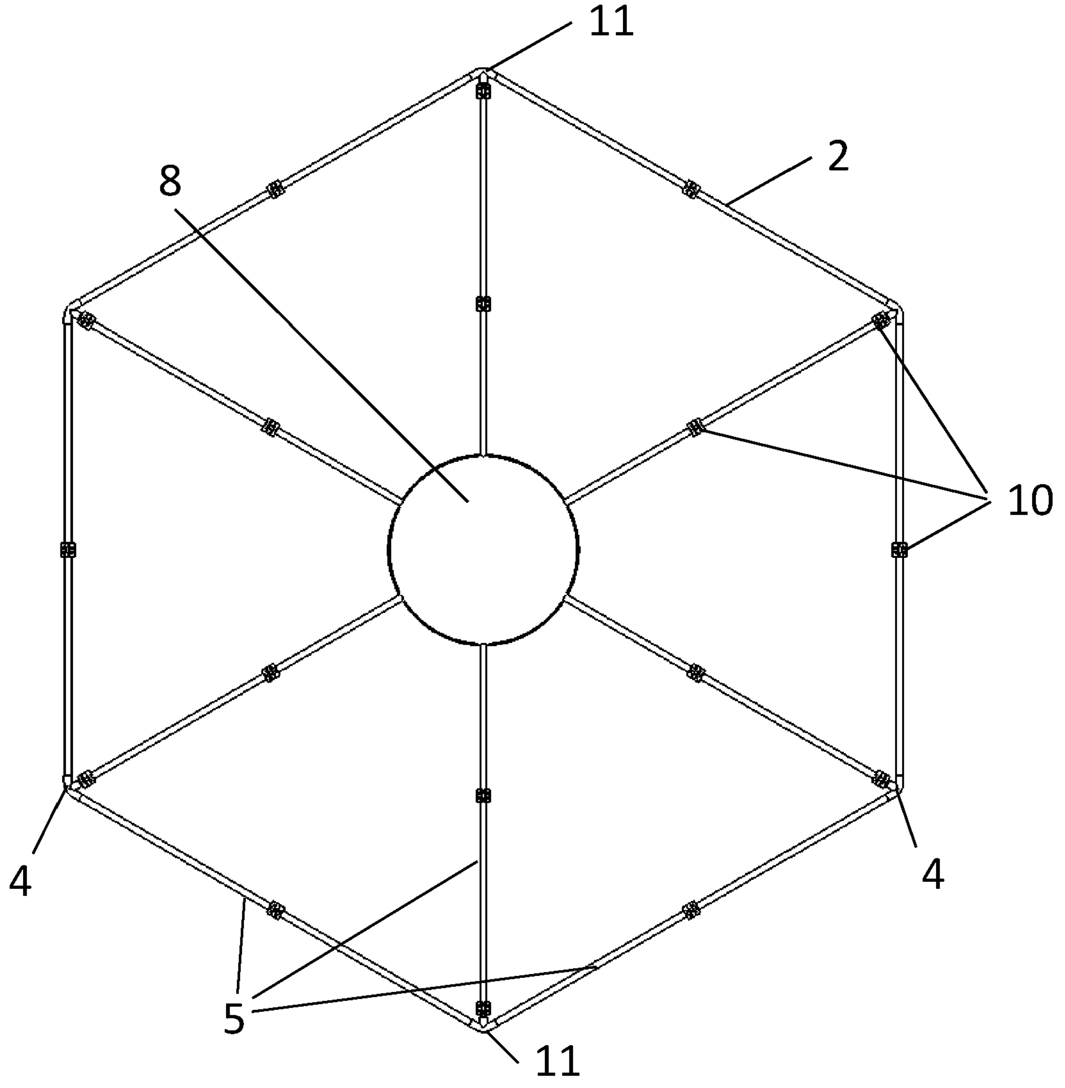
FIG. 4 Schematic depiction of the plan view of the supporting framework structure of a flight module.
Figure 6:
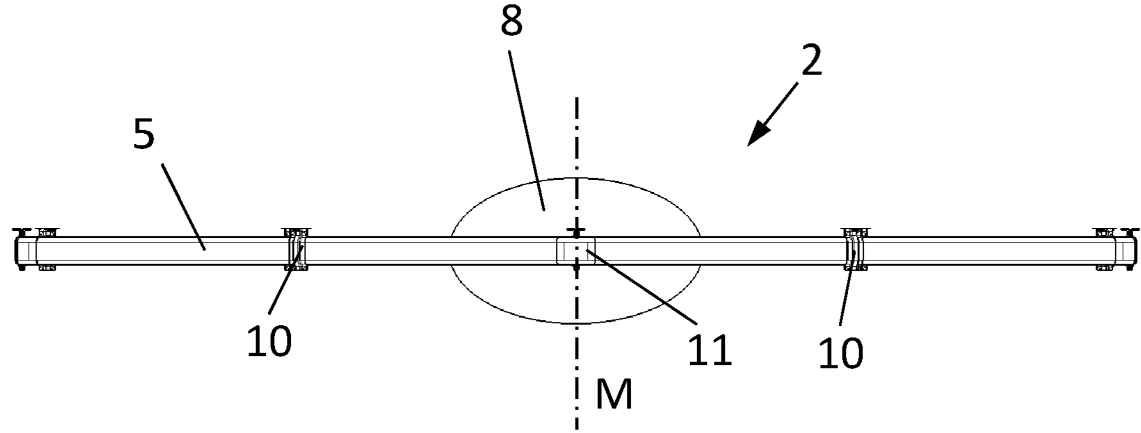
FIG. 6 Schematic depiction of the side view of the supporting framework structure of a flight module with central unit.

This supporting framework structure 2 and the central unit 8 of the flight module 1 according to FIG. 1 are shown schematically in FIG. 4 in the plan view and in FIG. 6 in the side view. The supporting framework structure 2 is formed by six framework struts 5 extending radially outwards from the central unit 8 and by six further framework struts which join together, at the node points 4, the ends of the radially extending framework struts 5 opposite to the central unit 8, forming a hexagon.

The framework struts 5 are connected to each other in a form-fitting manner at the node points 4 by means of T-piece-shaped connecting pieces 11.

The connecting pieces 11 in the example embodiment are made of a fiber-reinforced composite.

Figures 3A, 3B, 3C, 3D:
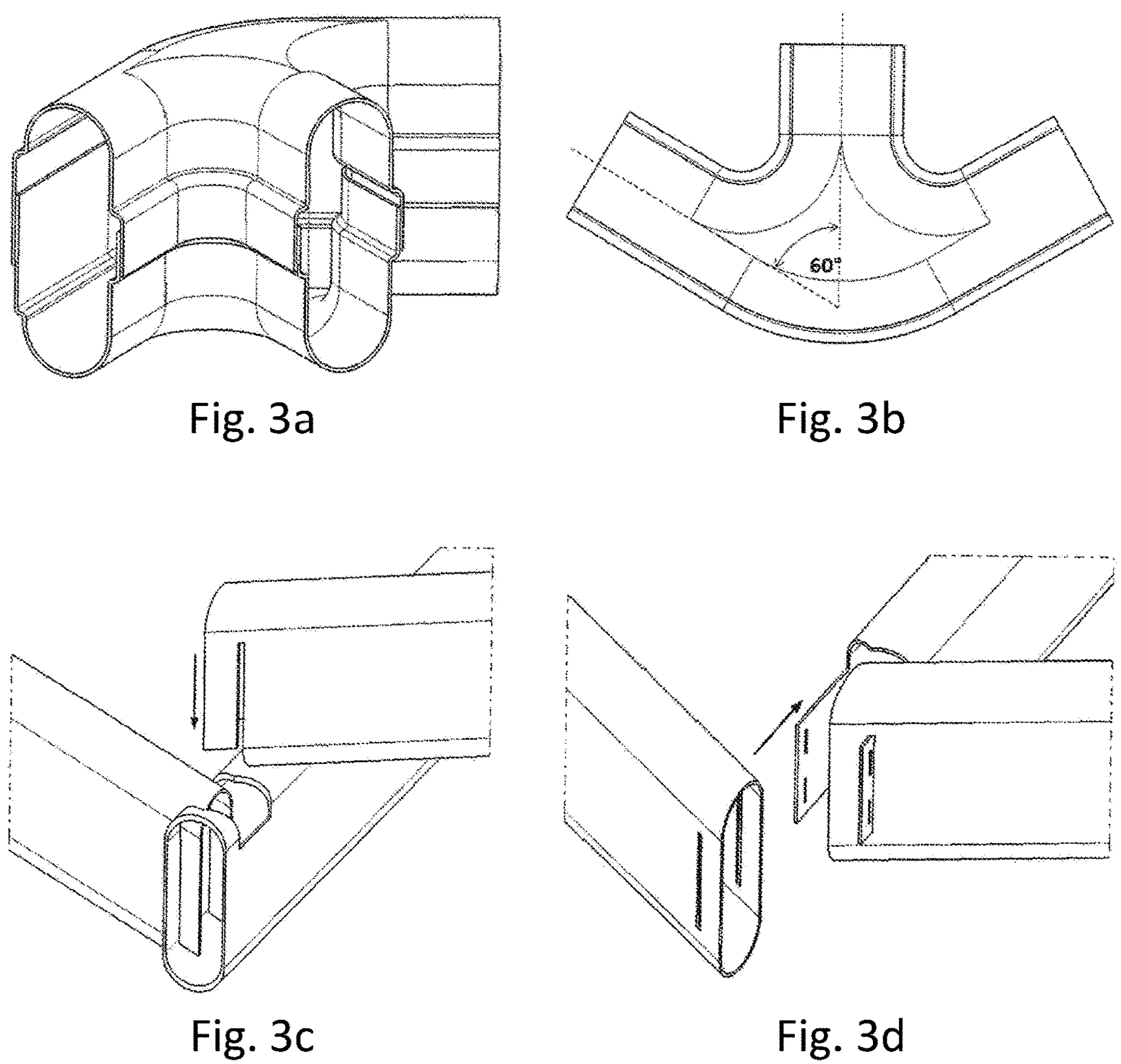
FIGS. 3*a*, 3*b* Detailed views of a connecting piece.
FIGS. 3*c*, 3*d* Detailed views of the ends of slot-together framework struts.

To simplify installation and maintenance, the connecting pieces 11 in the example embodiment are made in two parts comprising an upper and a lower shell (see detailed view according to FIG. 3*a*).

The ends of the framework struts 5 are for example inserted or placed at least 100 mm deep into the T-piece-shaped connecting pieces, where in the closed state of the two-part connecting pieces 11 the ends of the framework struts 5 are held in a fully enclosed manner.

The flush fit of the framework struts 5 in the connecting pieces 11 improves the alignability of the framework struts 5. In addition, the bearing forces are distributed more evenly.

To form the hexagonal shape of the supporting framework structure 2, the connecting pieces 11 have three arms, with two arms in each case enclosing an angle of 60° between each other (see detailed diagram according to FIG. 3*b*).

The framework struts 5 to be joined to each other can additionally be connected to each other inside the T-piece-shaped connecting piece in a form-fitting manner. For this purpose, the ends of the framework struts 5 can have slots and tabs by means of which the framework struts 5 can be slotted together at a defined angle to each other (FIG. 3*c*, 3*d*).

The slotted-together ends of the framework struts 5 can be placed into the upper or lower shell of the two-part T-piece-shaped connecting piece 11, and after closing the T-piece-shaped connecting piece 11 can be completely enclosed by the T-piece-shaped connecting piece 11.

Furthermore, FIG. 4 shows brackets as a fastening means 10, which serve to fasten drive units 3 to the struts 5 of the supporting framework structure 2. The fastening means 10 are arranged both approximately centrally on each supporting framework structure strut 5 and at the outer end of the framework struts 5 extending radially outwards from the central unit 8, but outside the node points 4. In the example embodiment, a total of 18 fastening means 10 are provided for attaching 18 drive units, however a different number of fastening means 10 and drive units 3 can be provided.

Figures 10A, 10B, 10C:
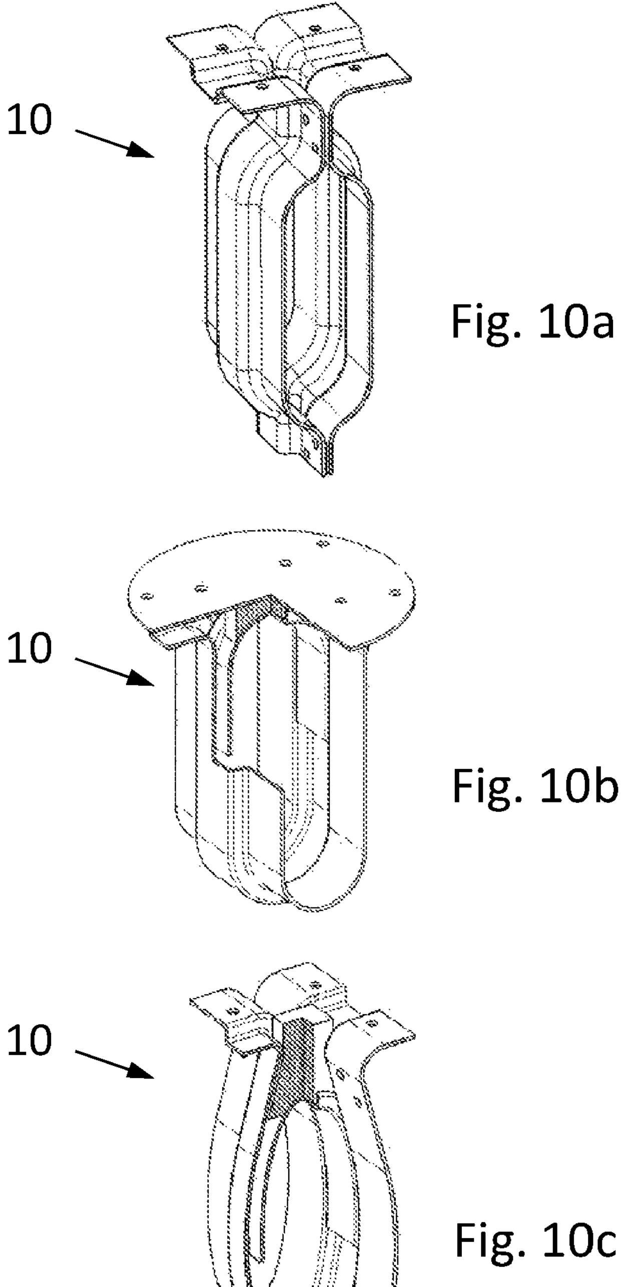
FIGS. 10*a-c* Schematic view of various brackets for attaching the drive units to the supporting framework structure.

The fastening means 10 can for example be designed as shown in FIGS. 10*a* to 10*c*.

FIG. 10*a* shows a two-part bracket 10 as a fastening element 10 comprising two half-shell-shaped bracket parts, each with ends angled to one side, which are clamped to the supporting framework structure strut 5 (not shown) by means of a bolted connection in the horizontal direction. The angled ends provide an area for joining the bracket parts to the drive unit 3 (not shown), where the bracket parts can be joined to the drive unit 3 by a bolted or riveted connection.

FIG. 10*b* shows a bracket as a fastening means 10, which has an omega-shaped lower bracket part with angled ends on both sides, a U-shaped upper bracket part and a flat cover element.

The omega-shaped lower bracket part encloses the framework strut at least partially at the sides and in the lower area. The omega-shaped lower bracket part encloses the framework strut 5 at least partially at the sides and in the lower area.

The cover element of the bracket is joined via a bolted or riveted connection to the angled ends of the omega-shaped bracket part, as a result of which the bracket is clamped in the vertical direction to the framework strut 5. Furthermore, the cover element serves to attach the drive unit 3 (not shown).

In addition, a compression piece (intermediate layer element) is provided, which supports the U-shaped upper bracket part against the cover element, as a result of which, when the bracket is closed, the omega-shaped lower bracket part and the U-shaped upper bracket part are pressed both against each other and against the framework strut 5, thus creating the force-fitting and form-fitting connection between the bracket and the framework strut 5. The compression piece can also be an integral part of the cover element or of the U-shaped bracket part.

The bracket according to FIG. 10*b* therefore is formed of four parts.

FIG. 10*c* shows a bracket as a fastening means 10, which has an omega-shaped lower bracket part with angled ends on both sides, a U-shaped upper bracket part and a compression piece (intermediate layer element).

The omega-shaped lower bracket part encloses the framework strut 5 at least partially at the sides and in the lower area, with the angled ends of the omega-shaped lower bracket part providing an area for joining to the drive unit 3.

The U-shaped upper bracket part encloses the framework strut 5 at least partially at the sides and in the upper area.

The angled ends of the omega-shaped bracket part can be attached by means of a bolted or riveted connection to the drive unit 3 (not shown), as a result of which the bracket is clamped in the vertical direction to the framework strut 5.

The additionally provided compression piece (intermediate layer element) supports the angled ends of the omega-shaped bracket part above the framework strut 5 and, when the bracket is closed and the drive unit 3 is fitted, it causes the omega-shaped lower bracket part and the U-shaped upper bracket part to be clamped against the framework strut 5, thus creating the force-fitting and form-fitting connection between the bracket and the framework strut 5. The compression piece can be an integral part of the U-shaped bracket part.

The bracket according to FIG. 10*c* therefore is formed of three parts.

In the upper area, the fastening means 10 according to FIGS. 10*a* to 10*c* each have angled ends for direct attachment of the drive units 3 (FIG. 10*a*, 10*c*), or for indirect attachment of the drive units 3 (FIG. 10*b*) via the cover element.

The drive units 3 can be bolted or riveted to the angled ends or to the cover element.

The fastening means 10 according to FIGS. 10*a* to 10*c* each form an omega shape when assembled, i.e. their outer shape approximately corresponds to the Greek capital letter omega. In addition, the fastening means 10 are designed in such a way that they follow the outer contour of the framework struts 5 as far as possible and at least partially surround the framework strut at the sides and at the bottom, so that a force-fitting and form-fitting connection with the framework strut 5 is ensured in the connected state.

The framework struts 5 consist of a pultruded hollow profile made from fiber-reinforced plastic, e.g. carbon-fiber-reinforced plastic.

Figures 9A, 9B, 9C:
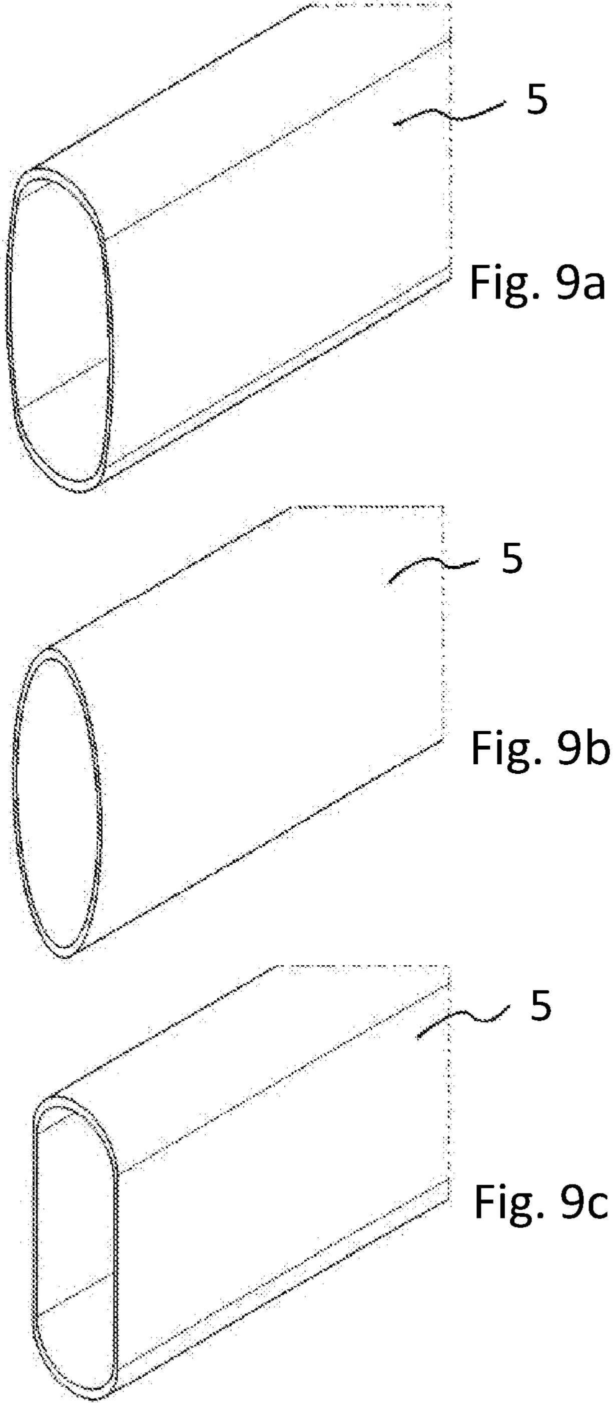
FIGS. 9*a-c* Schematic view of various framework strut cross-sections.

Favourable designs of the hollow profiles of the framework strut each have a longitudinally extended profile cross-section as shown in FIGS. 9*a*, 9*b* and 9*c*. FIGS. 9*a* to 9*c* show three hollow profiles in sectional view, of which the hollow profile according to FIG. 9*a* has a preferably oval cross-section, the hollow profile according to FIG. 9*b* has an elliptical cross-section, and the hollow profile according to FIG. 9*c* has an oblong cross-section. The longitudinal sides of the hollow profiles each point in a vertical effective direction of the drive units 3 (not shown).

The hollow profile of the framework struts 5 according to FIGS. 9*a*, 9*b* and 9*c* in each case has a variable wall thickness in the circumferential direction of the framework strut 5.

The wall thickness is greater in areas of the circumference with high stress due to forces acting on it than in areas of lower stress. For example, as can be seen in FIG. 9*a*, 9*b*, 9*c* the wall thickness can be greater in the area of the small sides of the circumference (top and bottom in the depiction according to FIG. 9*a*, 9*b*, 9*c*) than in the area of the longitudinal sides of the circumference. Furthermore, the wall thickness can vary not only in the circumferential direction along the cross-section, but also along the longitudinal extension of the strut 5. For example, the wall thickness of the framework struts extending radially outwards from the central unit 8 can increase from the outside to the inside in the direction of the central unit 8. The occurring loads can be computer-simulated to calculate the required minimum wall thickness.

Cables for signal connections and the power supply run through the hollow profile.

Referring again to FIG. 1, it can be seen that the flight module 1 has drive units 3 that each have a propeller 7 with a rotor of two rotor blades and a brushless DC motor as electric motor 6, with the propeller 7 being driven by the electric motor 6. By means of a hub of the respective propeller 7, the propeller is rotatably mounted on the electric motor 6.

Optionally a cover, e.g. in the form of a spinner, can be present to seal the drive unit 3 against water and dirt and to improve the aerodynamics. The propellers 7, in particular its rotors, have a fiber-reinforced composite material, e.g. carbon-fiber-reinforced plastic.

Figure 5:
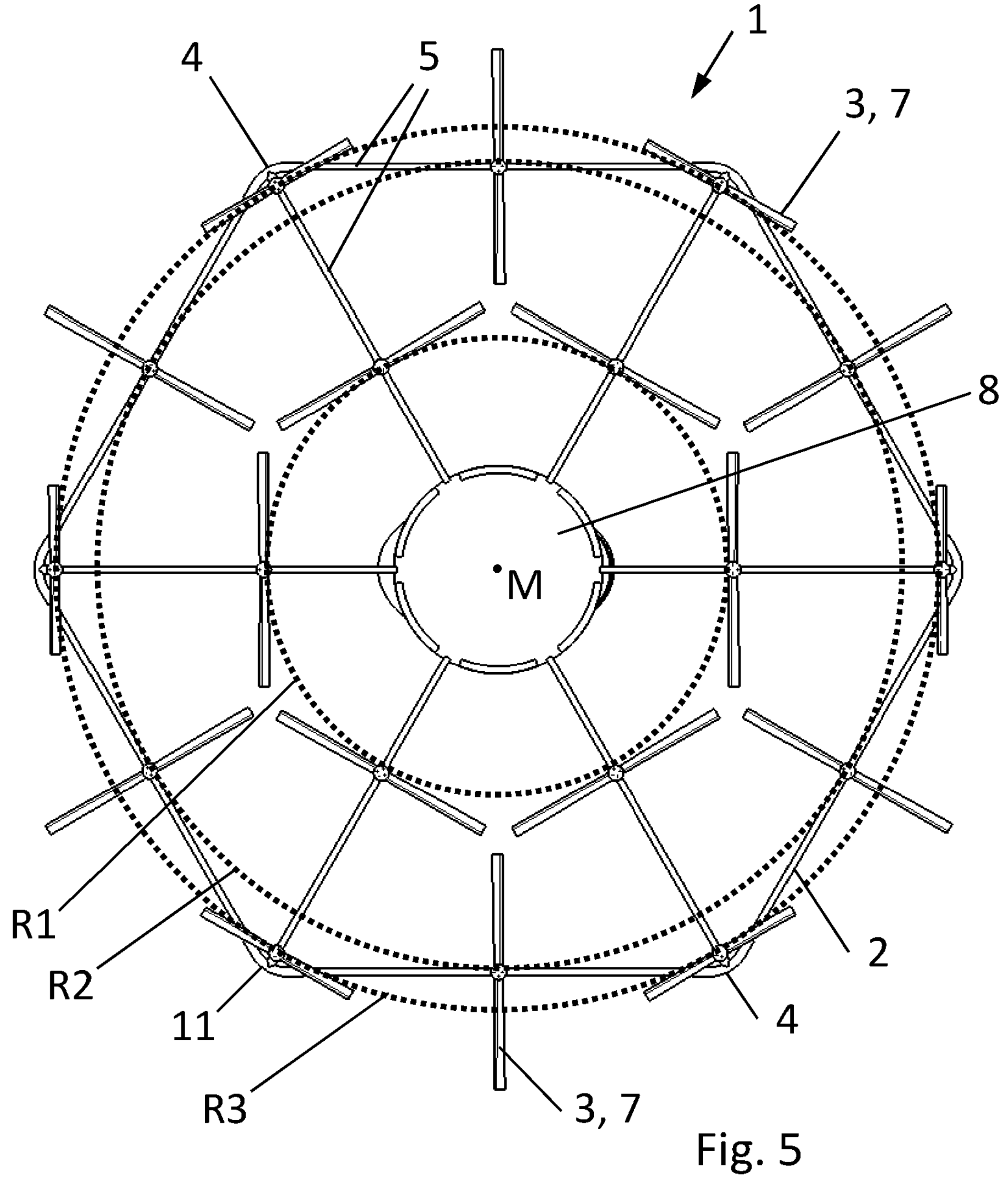
FIG. 5 Schematic depiction of the plan view of a flight module with supporting framework structure, drive units arranged on it, and central unit.

FIG. 5 shows a schematic plan view of the flight module 1 according to FIG. 1.

The drive units 3, in the example embodiment 18 drive units 3, are arranged in a plane E of the supporting framework structure 2 outside the node points 4 in a first, a second and a third ring (R1, R2, R3) each with six drive units 3 concentrically around the vertical central axis (M) of the flight module 1. The first, second and third ring R1, R2, R3 have a different ring diameter DR1, DR2, DR3 (also shown in FIG. 7).

The drive units 3 are attached directly to the framework struts 5 of the supporting framework structure 2 by means of the fastening means 10 designed as brackets.

Figure 7:
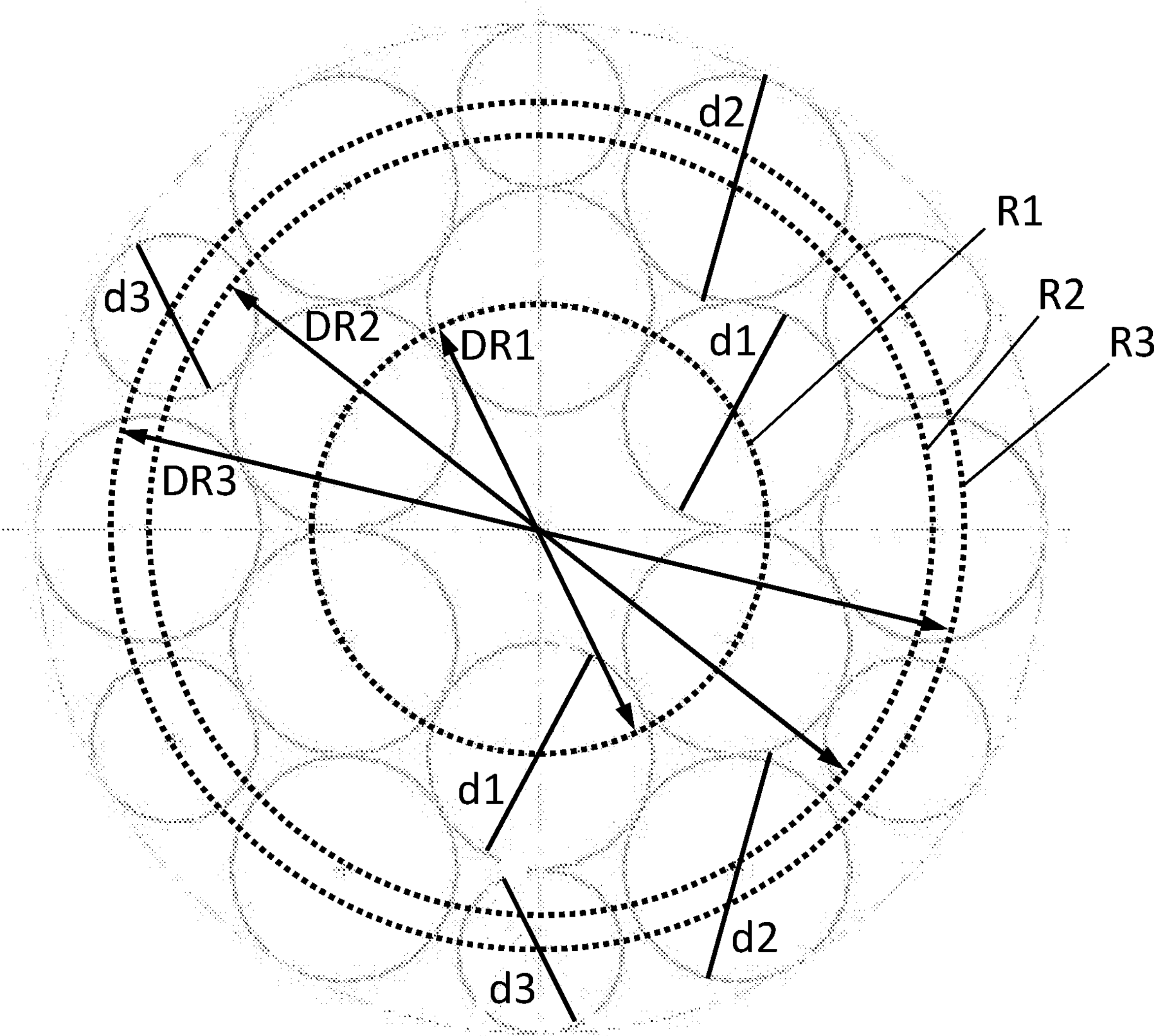
FIG. 7 Schematic depiction of the airspace covered by the propellers of the drive units of a flight module in a first variant.

The rotors of the propellers 7 of the drive units 3 have different diameters d1, d2, d3. In the example embodiment, the rotors of the six propellers 7 of the drive units 3 of the first (inner) ring R1 have a first uniform diameter d1 of 1800 mm. The rotors of the six propellers 7 of the drive units 3 of the second ring R2 have a second diameter d2, which in the example embodiment is equal to the diameter d1 of the rotors of the propellers 7 of the inner first ring of 1800 mm. The rotors of the six propellers 7 of the drive units 3 of the third ring R3 have a third diameter d3 of 1300 mm (FIG. 7). In other words, the flight module 1 has twelve propellers 7 with rotors with a diameter d1, d2 of 1800 mm and six propellers 7 with rotors with a diameter d3 of 1300 mm.

According to this exemplary embodiment, the arrangement of the drive units around the vertical centre axis (M) and the size of the propeller rotors results in an overall maximum diameter of the flight module of 8.14 m.

FIG. 7 is a schematic plan view of the flight module 1 showing the airspace coverage achievable by the rotors of the propellers 7 of the drive units 3 of the flight module 1. It can be seen that the described selection of the rotors of the propellers 7 achieves a high concentration of the coverable area above the supporting framework structure 2 and hence very good airspace coverage, even though only two rotor types of different diameter have to be manufactured.

The very good airspace coverage improves the performance of the flight module 1 and at the same time minimises the space requirements of the flight module 1 for take-off and landing and while on the ground, which is advantageous particularly when operating the flight module 1 in an urban environment.

The central unit 8 of the flight module 1 is designed in the form of a hemisphere made of carbon-fiber-reinforced or glass-fiber-reinforced plastic. The communication and control technology of the flight module 1 is located in the central unit 8. In addition, the central unit 8 contains rechargeable batteries for supplying energy to the drive units 3 and other electrical consumers.

Optionally, the central unit 8 can also accommodate a rescue system with a parachute for shooting out.

The central unit 8 of the flight module 1 has a coupling device, e.g. a coupling counterpart of an articulated coupling between a couplable transport module 9 and the flight module 1 (not shown), for the detachable and directionally flexible connection of the flight module 1 to a transport module 9.

Figure 8:
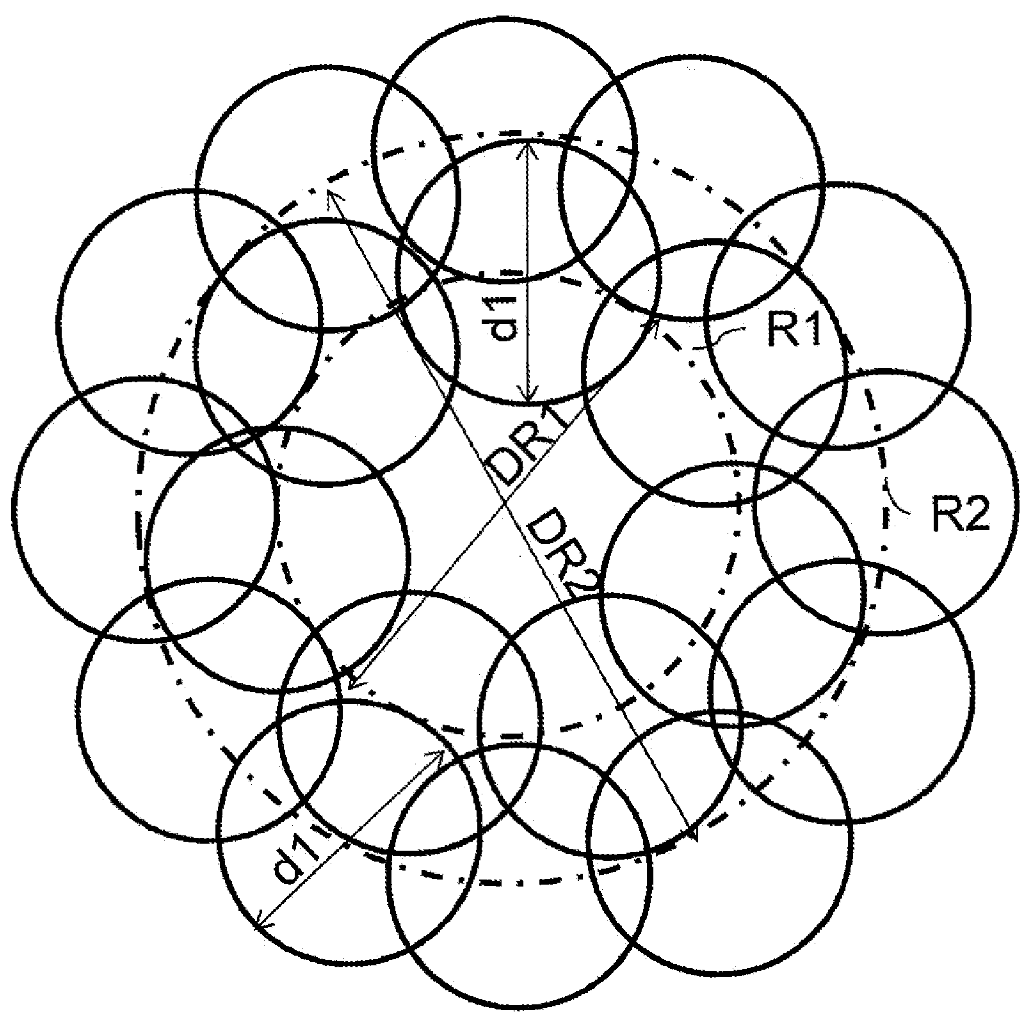
FIG. 8 Schematic depiction of the airspace covered by the propellers of the drive units of a flight module in a further variant.

FIG. 8 is a schematic plan view of the flight module 1 showing the airspace coverage by the propellers 7 of the drive units 3 of a flight module 1 in another variant. In this embodiment, the drive units 3 are arranged in two rings R1, R2 around the centre axis (M) of the flight module 1, with the two rings R1, R2 having different ring diameters DR1, DR2. The inner ring R1 with a smaller ring diameter DR1 than the outer ring R2 has six drive units 3. The outer ring R3 has twelve drive units 3.

The rotors of the propellers 7 of the drive units 3 of a ring R1, R2 as well as of rings R1, R2 have a uniform diameter d1. Therefore the diameter d1 of all rotors is the same size, which simplifies the manufacturing and assembly of the flight module 1.

Furthermore, the ring diameters DR1, DR2 and the diameter d1 of the rotors are selected in such a way that the airspace is covered in an overlapping manner. In other words, the airspaces used by the rotors overlap at least partially in the plan view of the flight module 1.

FIG. 2 shows the flight module 1 according to FIG. 1 with a transport module 9 coupled in this way. The coupling device is arranged centrally on the underside of the central unit 8, so that the transport module 9 is also located centrally below the flight module 1. The transport module 9 can have a transportation capsule and an attached longitudinally extending shaft; the shaft, as shown in FIG. 2, can be arranged in extension of the centre axis (M) of the flight module 1.

By means of the articulated coupling, the inclination of the flight module 1 relative to the coupled transport module 9 can be varied. In this way, a vertical alignment of the transport module 9 can be largely maintained during flight operation even if the orientation of the flight module 1 varies, and the aircraft's centre of gravity can be centred on a limited central area of the flight module, which improves the comfort and the controllability of the aircraft.

Figure 11:
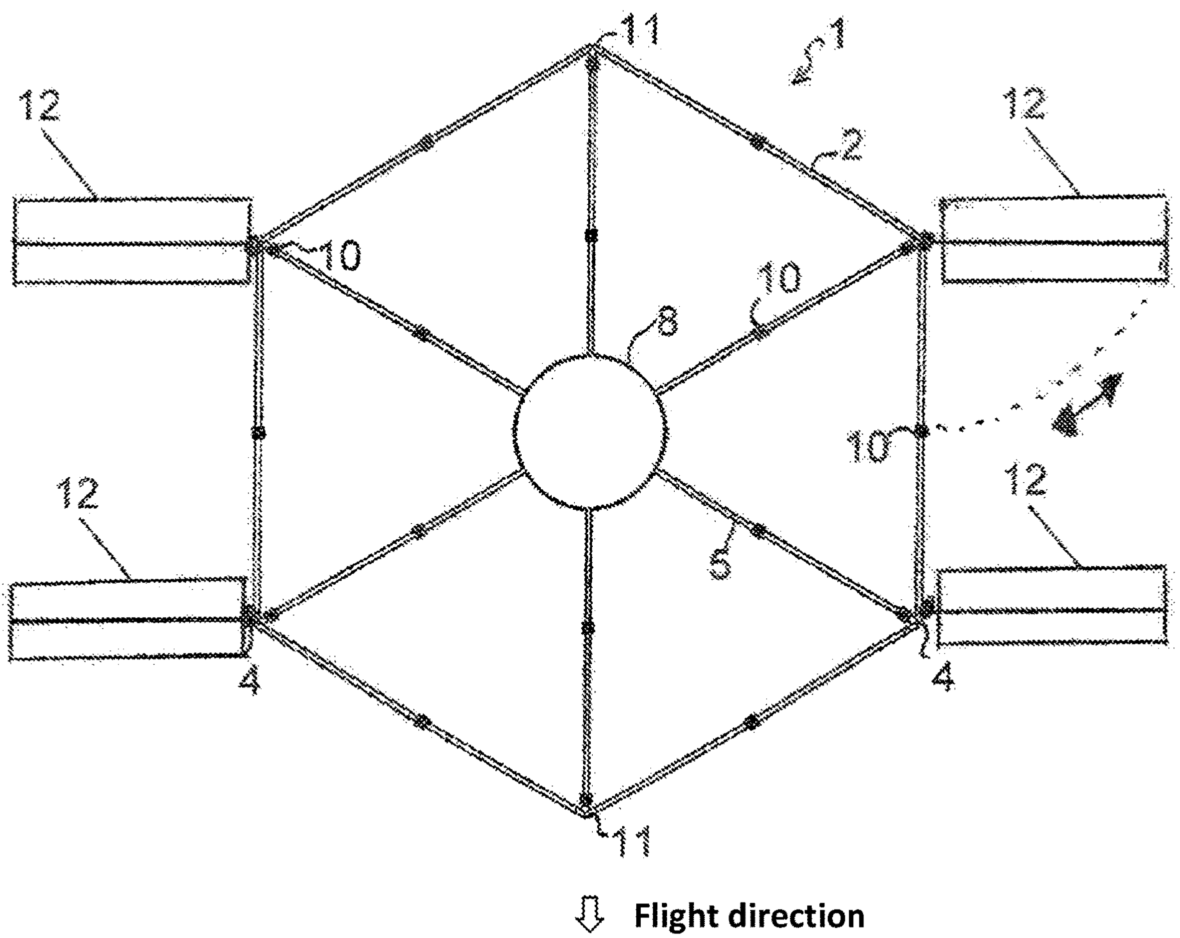
FIG. 11 Schematic depiction of the plan view of a supporting framework structure of a flight module with air guiding devices.

FIG. 11 shows a flight module 1 of FIG. 4 with four air guiding devices 12, which act as a means of lift. The air guiding devices 12 have flat wings. They can be attached to the framework struts 5 of the supporting framework structure 2 of the flight module 1 or to the connecting pieces 11 for connecting the framework struts 5 of the supporting framework structure 2.

They can be designed to be rotatably mounted so that the air guiding devices 12 can be folded up against the supporting framework structure 2 and unfolded from it (dotted line with double arrow).

The air guiding devices 12 each have a flat wing 12, which for example is mounted so as to be rotatable about its longitudinal axis.

When flying forward at an appropriate high speed in the direction indicated, the wings are folded out and assist the propellers 7 of the drive units 3 (not shown here) to generate additional lift.

In addition, the wings can be rotated around their longitudinal axis to change the angle of incidence relative to the airflow and thus adjust the lift.

Preferably the wings are located in the upper or lateral region of the supporting framework structure 2 of the flight module 1 on the framework struts 5, because here the influence of the downflow from the propellers 7 is lowest.

The air guiding devices 12 can be designed to be controllably adjustable in their orientation to the transport module 9, or rather to the supporting framework structure 2 of the flight module 1, so that their function can be optimally adapted to the flow conditions etc. during flight operation.

Figure 12:
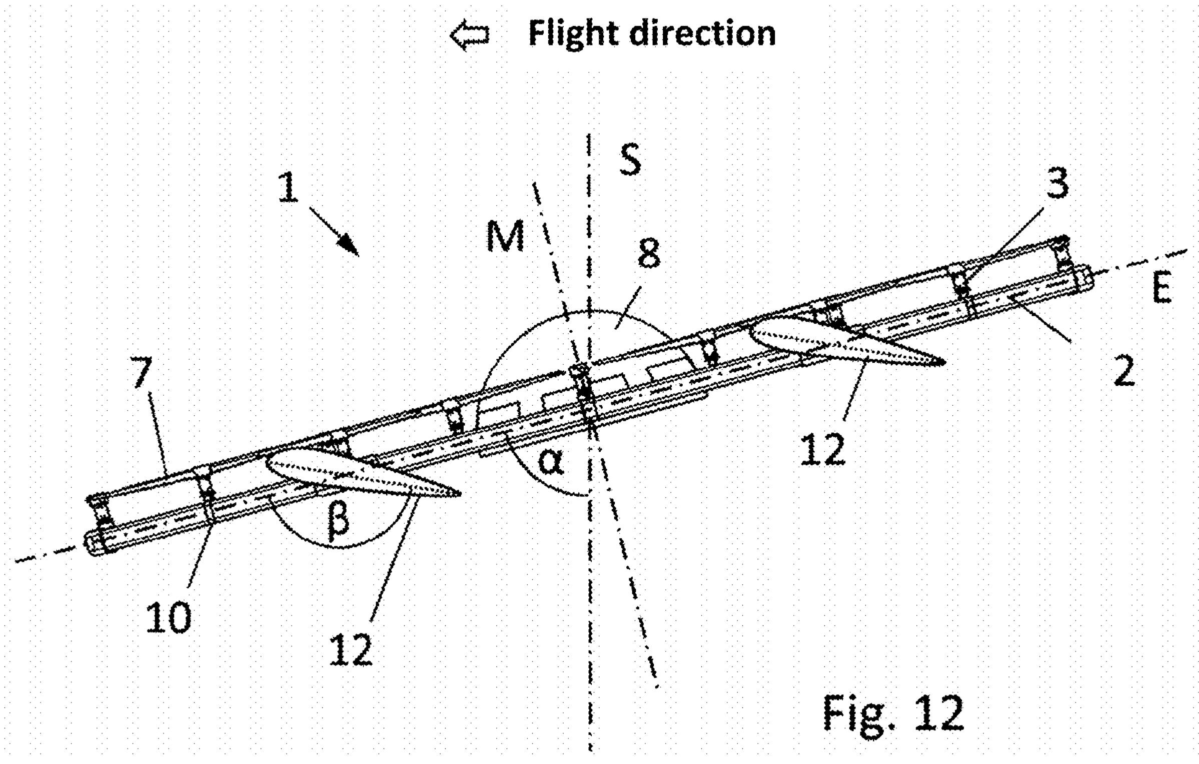
FIG. 12 Schematic view of a tilted flight module with adjusted air guiding devices.

FIG. 12 shows a side view of a flight module 1 tilted downward in the flight direction with a tilt angle $\alpha$ of approximately 75°. The tilt angle $\alpha$ is enclosed by the plane E of the supporting framework structure 2 and the vertical line of gravity S. Such a tilt angle $\alpha$ can be set, for example, during the acceleration of the flight module 1.

The flight module 1 has four air guiding devices 12, which are arranged on the supporting framework structure 2 of the flight module 1 as shown in the plan view in FIG. 11, and of which only two can be seen in FIG. 12. The air guiding devices 12 are set at an angle of incidence ß of approximately 150° with respect to the plane E of the supporting framework structure 2. The angle of incidence ß is enclosed by the plane E of the supporting framework structure 2 and the central cross-sectional plane of the air guiding device 12.

In a braking situation (not shown), the tilt of the flight module 1 with respect to the line of gravity S and the set position of the air guiding devices 12 can be reversed, so that for example a tilt angle $\alpha$ of approximately 105° and an angle of incidence ß of approximately 235° can result.

With regard to the other elements of the flight module 1 of FIG. 12, reference is made to the previous explanations.

The term "and/or" used here, when used in a series of two or more elements, means that any of the listed elements may be used alone, or any combination of two or more of the listed elements may be used.

For example, if a relationship is described that contains the components A, B and/or C, the relationship can contain the component A alone; B alone; C alone; A and B in combination; A and C in combination; B and C in combination; or A, B and C in combination.

LIST OF REFERENCE NUMERALS

1 Flight module
2 Supporting framework structure
3 Drive unit
4 Node point
5 Framework strut
6 Electric motor
7 Propeller
8 Central unit
9 Transport module
10 Fastening means

11 Connecting piece
12 Air guiding device
R1, R2, R3 First, second, third ring
d1, d2, d3 Diameter of the rotor
DR1, DR2, DR3 Diameter of the ring
M Centre axis of the flight module
E Plane of the supporting framework structure
S Line of gravity
α Tilt angle
ß Angle of incidence

What is claimed is:

1. A flight module for a vertical take-off and landing aircraft, wherein the flight module is connectable to a transport module for transporting persons and/or payload of the aircraft and comprises a supporting framework structure which comprises framework struts connected to one another at node points by connecting pieces and forming a self-contained supporting framework structure, wherein several drive units which each comprise a drive unit comprising an electric motor and at least one propeller operatively connected to the electric motor are arranged on the supporting framework structure, at least some of the drive units being affixed to the framework struts of the supporting framework structure by fixing elements, and wherein the flight module further comprises a coupling device for coupling and uncoupling the flight module to and from the transport module and additionally comprises one or more air guiding devices affixed to the framework struts and/or the connecting pieces of the supporting framework structure, the one or more air guiding devices being configured such that their position can be rotated in relation to a rest of the flight module with a variable angle of incidence ß.

2. The flight module of claim 1, wherein the connecting pieces are configured such that a flush fit of the framework struts in the connecting pieces is realized.

3. The flight module of claim 1, wherein the framework struts are connected with a form fit inside the connecting pieces.

4. The flight module of claim 1, wherein the coupling device is designed as a coupling counterpart of an articulated coupling between the flight module and the transport module.

5. The flight module of claim 1, wherein the drive units are arranged in one or more rings around a center axis (M) of the flight module.

6. The flight module of claim 5, wherein rotors of the propellers of the drive units of a ring have different diameters.

7. The flight module of claim 1, wherein at least some of the framework struts are in the form of a hollow profile.

8. The flight module of claim 7, wherein the hollow profile of a framework strut has a variable wall thickness in a circumferential direction of the framework strut and/or a variable wall thickness along a longitudinal extension of the framework strut.

9. The flight module of claim 1, wherein the supporting framework structure and/or a central unit thereof and/or at least some of the drive units comprise components of fiber-reinforced composite or consist of fiber-reinforced composite which comprises monodirectionally arranged reinforcing fibers.

10. The flight module of claim 7, wherein the hollow profile has an oval profile cross section.

11. A flight module for a vertical take-off and landing aircraft, wherein the flight module is connectable to a transport module for transporting persons and/or payload of the aircraft and comprises a supporting framework structure which comprises framework struts that are connected by connecting pieces at node points to form a self-contained supporting framework structure, wherein a plurality of drive units each of which comprises an electric motor and at least one propeller operatively connected to the electric motor is arranged on the supporting framework structure, at least some of the drive units being affixed to the framework struts of the supporting framework structure by fixing elements, wherein the flight module further comprises a coupling device for coupling and uncoupling the flight module to and from the transport module, and wherein at least some of the framework struts are formed as a hollow profile which has a variable wall thickness in a circumferential direction of the framework strut and/or has a variable wall thickness along a longitudinal extension of the framework strut.

12. The flight module of claim 11, wherein the hollow profile has an oval profile cross section.

13. The flight module of claim 11, wherein the connecting pieces are configured such that a flush fit of the framework struts in the connecting pieces is realized.

14. The flight module of claim 11, wherein the framework struts are connected with a form fit inside the connecting pieces.

15. The flight module of claim 11, wherein the drive units are arranged in one or more rings around a center axis (M) of the flight module.

16. The flight module of claim 11, wherein the supporting framework structure and/or a central unit thereof and/or at least some of the drive units comprise components of fiber-reinforced composite or consist of fiber-reinforced composite which comprises monodirectionally arranged reinforcing fibers.

17. The flight module of claim 11, wherein the coupling device is designed as a coupling counterpart of an articulated coupling between the flight module and the transport module.

18. The flight module of claim 1, wherein the flight module further comprises a central unit.

19. The flight module of claim 11, wherein the flight module further comprises a central unit.

20. The flight module of claim 1, wherein the one or more air guiding devices are configured to be foldable up against and unfoldable from the supporting framework structure and/or are mounted so as to be rotatable about their longitudinal axes.

* * * * *